(12) United States Patent
Sato et al.

(10) Patent No.: US 6,365,012 B1
(45) Date of Patent: Apr. 2, 2002

(54) MAGNETIC RECORDING MEDIUM AND A METHOD OF MANUFACTURING THE SAME

(75) Inventors: Toshiyuki Sato; Shinya Katayama, both of Tsukuba (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 08/443,556

(22) Filed: May 18, 1995

Related U.S. Application Data (63) Continuation of application No. 08/147,033, filed on Nov. 3, 1993, now abandoned, which is a continuation of application No. 07/733,833, filed on Jul. 22, 1991, now abandoned.

(30) Foreign Application Priority Data

Jul. 24, 1990 (JP) .............................................. 2-195702

(51) Int. Cl.[7] ................................................ C23C 14/34
(52) U.S. Cl. ................... 204/192.16; 427/131; 427/532; 427/533; 427/535; 427/539; 204/192.2; 204/192.15
(58) Field of Search ....................... 204/192.15, 192.16, 204/192.2; 427/127, 131, 130, 532, 533, 535, 539

(56) References Cited

U.S. PATENT DOCUMENTS

| | | | | |
|---|---|---|---|---|
| 4,702,960 A | * | 10/1987 | Ogman | 428/367 |
| 4,737,415 A | * | 4/1988 | Ichijo et al. | 428/447 |
| 4,777,090 A | * | 10/1988 | Ovshinsky et al. | 428/408 |
| 4,839,244 A | * | 6/1989 | Tsukamoto | 428/694 |
| 4,840,844 A | * | 6/1989 | Futamoto et al. | 428/336 |
| 4,861,662 A | * | 8/1989 | Kobliska et al. | 428/408 |
| 5,049,410 A | * | 9/1991 | Johany et al. | 427/131 |
| 5,055,359 A | * | 10/1991 | Tsuno et al. | 428/448 |
| 5,069,967 A | * | 12/1991 | Yokoyama | 427/131 |
| 5,098,541 A | * | 3/1992 | Funkenbusch | 204/192.16 |
| 5,104,209 A | * | 4/1992 | Kokaku et al. | 428/64 |
| 5,113,302 A | * | 5/1992 | Shimizu et al. | 360/135 |
| 5,116,665 A | * | 5/1992 | Gauthier et al. | 428/216 |
| 5,132,173 A | * | 7/1992 | Hashimoto et al. | 204/192.2 |
| 5,275,850 A | * | 1/1994 | Kitoh et al. | 427/577 |

FOREIGN PATENT DOCUMENTS

| | | | |
|---|---|---|---|
| JP | 61087870 | * | 5/1986 |
| JP | 61-160834 A | | 7/1986 |
| JP | 61-208618 A | | 9/1986 |
| JP | 61-208620 A | | 9/1986 |
| JP | 61-220120 A | | 9/1986 |

* cited by examiner

*Primary Examiner*—Rodney G. McDonald
(74) *Attorney, Agent, or Firm*—Woodcock Washburn LLP

(57) ABSTRACT

This invention relates to a magnetic recording medium having a structure in which an undercoating film, a magnetic thin film, a protective film, and an organic film are stacked on a substrate in the order named. Since the protective film contains carbon and silicon and a portion of silicon in at least an interface in contact with the organic film consists of a silicon oxide, the surface of the magnetic recording medium is not degraded even by frequent contact with a magnetic head upon driving or stopping of the magnetic recording medium. This invention also relates to a method of manufacturing the same.

5 Claims, 6 Drawing Sheets

MAGNETIC RECORDING MEDIUM AND A METHOD OF MANUFACTURING THE SAME

This is a continuation of application Ser. No. 08/147,033, filed Nov. 3, 1993 now abandoned, which in turn is a continuation of application Ser. No. 07/733,833, filed Jul. 22, 1991 now abandoned.

BACKGROUND OF THE INVENTION

1. Field of the Invention

The present invention relates to a magnetic recording medium for use in a magnetic disk apparatus for information recording and a method of manufacturing the same.

2. Description of the Prior Art

As a magnetic recording medium for performing high-density recording such as a hard magnetic disk, a metal magnetic thin-film medium formed by a coating method such as a plating method, a sputtering method, or a deposition method is used.

Recording of information in a hard magnetic disk or reproduction of recorded information therefrom is performed by a CSS (Contact Start/Stop) system. In this system, the disk is rotated at a predetermined speed to form a thin air layer between a magnetic head and the magnetic disk. When the rotation of the magnetic disk is to be started or stopped, the magnetic head and the magnetic disk are moved relative to each other in a contact-frictional state. In the CSS system, abrasion on the contact surfaces of both the magnetic head and the magnetic disk is advanced by a frictional force of contact sliding. In addition, if fine dust is present during recording or reproduction, the magnetic head may be brought into contact with the surface of the magnetic disk at high speed to cause a large frictional force between the magnetic head and the surface of the magnetic disk, thereby destroying the magnetic head and or the magnetic thin film. Especially in a metal magnetic thin film medium, since a friction coefficient of the metal magnetic thin film is large and the thickness of the film is small, the above problem conspicuously arises.

To solve the above problem, i.e., to improve a corrosion resistance of the magnetic recording medium and lubricating properties on its surface, Japanese Patent Laid-Open No. 61-208620 discloses a magnetic recording medium in which a carbon protective film is formed on a metal magnetic thin film and a liquid lubricating agent is coated on the protective film. Also, Japanese Patent Laid-Open No. 61-160834 discloses a magnetic recording medium in which an inorganic oxide film consisting of, e.g., $SiO_2$ formed on a metal magnetic thin film directly or via a first protective film and a liquid lubricating agent such as a fluorine-containing oil, e.g., perfluoroalkylpolyether is coated thereon. In addition, Japanese Patent Laid-Open No. 61-208618 or 61-220120 discloses a method of increasing a bonding force between a lubricating organic film and an inorganic oxide protective film to improve adhesion properties.

However, in the prior art in which the liquid lubricating agent is coated on the carbon protective film, a bonding force between the lubricating agent and the protective film is weak. Therefore, when the CSS is repeatedly performed, the effect of the lubricating agent is gradually reduced to increase a frictional force between the magnetic head and the magnetic disk medium. In addition, since the carbon protective film is abraded, no satisfactory abrasion or damage resistance can be obtained.

In the prior art in which the inorganic oxide film is formed as the uppermost layer of the protective film of the magnetic disk medium and the lubricating agent having a polar group or a functional group is coated on the surface of the inorganic oxide film, the bonding force between the protective film and the lubricating agent is increased. However, it is difficult to coat a lipophilic lubricating agent on the entire surface of the hydrophilic protective film without forming fine pinholes. Therefore, coating of the lubricating agent is sometimes not performed on the entire surface of the protective film to expose the protective film not having a solid lubricating effect on the surface of the magnetic disk medium. In this case, when the CSS operation is repeatedly performed, film destruction is caused on a portion not coated with the lubricating agent.

OBJECTS AND SUMMARY OF THE INVENTION

The present invention has been made to solve the above conventional problems and has as its object to provide a magnetic recording medium having a surface which is not deteriorated even by frequent contact with a magnetic head upon driving or stopping of the magnetic recording medium, and a method of manufacturing the same.

It is another object of the present invention to provide a magnetic recording medium which does not cause a large frictional force between a magnetic head and the surface of the magnetic recording medium and therefore does not allow the magnetic head to destroy a magnetic thin film, and a method of manufacturing the same.

It is still another object of the present invention to provide a method of manufacturing a magnetic recording medium, which can convert silicon in a protective film into a silicon oxide by oxidation at a high speed within a short time period, thereby manufacturing a magnetic recording medium at a low cost.

The present invention is a magnetic recording medium in which a magnetic thin film is formed on a substrate directly or via an undercoating film, a protective film is formed on the magnetic thin film, and a lubricating organic film is formed on the protective film, wherein the protective film contains carbon and silicon, and silicon in at least an interface in contact with the organic film and in the vicinity of the interface is partially or entirely a silicon oxide. That is, the magnetic recording medium of the present invention contains, as components of the protective film in contact with the lubricating organic film, carbon and a silicon oxide, or carbon, silicon and a silicon oxide.

In order to maintain solid lubricating properties of the protective film and improve adhesion properties with respect to the lubricating organic film to be overcoated, the silicon oxide in the protective film may be uniformly present in the thickness direction of the protective film or may have a concentration distribution in the thickness direction. In particular, the silicon oxide is preferably contained in a large amount in an interface with respect to the lubricating organic film and in the vicinity of the interface and contained in only a small amount or not contained at all on the magnetic thin film side because the solid lubricating properties and the adhesion properties can be maintained and magnetization characteristics of the magnetic thin film are not degraded by oxidation upon formation of the protective film on the magnetic thin film.

The content of silicon in the protective film according to the present invention is preferably 1% to 30% (atomic %) with respect to the content of carbon. If this value is less than 1%, an Si—O coupling is hardly generated at the surface, so that an adhering force of oil is not improved and the effect is not entirely attained. In turn, in the event that a sufficient amount of oil is applied on the surface, an amount of wear at a continuous vibrating test (a drag test) at the head or a continuous sliding test (a pin disk test) at the same ball material as that of the head member is preferably less as an amount of silicon is increased. However, in turn, in the even that the value is more than 30%, the Si—C coupling in the film is increased, resulting in that a film breakage form is changed from a mild wearing as that of carbon less than that to a severe wearing (a wearing with the film breakage) and an anti-scaring characteristic is decreased and the head is easily crushed if the head is contacted with the disk during CSS. in addition, in the even that an amount of oil is less or that a partial loss in one disk is found, the film is broken into CSS and so this is not preferable. A value less than 30% indicating a mild wearing is preferable. A more preferable value is 5 to 25% . An effect of improving an adhering force of oil with Si—O coupling at the surface is remarkable at a value more than 5% and a CSS characteristic is improved, so that this value is more preferable. In addition, a value of amount of Si less than 25% is more superior in view of an anti-damage characteristic and this is more preferable even in the event that the oil is not applied (a degree of wear through the aforesaid continuous sliding test), it is more preferable. This value is more preferably 5 to 15%. An anti-wearing characteristic in the event that oil is not applied (a degree of wearing under the aforesaid continuous sliding test) is preferable if the less amount of Si is applied and in turn if the oil is applied, it is preferable that a large amount of Si is applied. In view of both characteristics, a maximum preferable amount of Si is 15%. In addition, the most preferable amount is 10 to 15%. A stable and preferable range of an actual production in the aforesaid 5 to 15% value is within 10 to 15%. That is, in view of the fact that the upper-most surface of the disk before applying oil is contaminated by some contaminations, the oil may not be sufficiently held under a value of 10% or less and the CSS characteristics is deteriorated. In this case, if a fine pinhole or a portion where adhesion strength is locally weak is present in the lubricating organic film coated on the protective film, the organic film may be removed from the protective film to cause the protective film to be brought into direct contact with a magnetic head upon sliding of the magnetic head. The damage resistance means a resistance with which a film damage which may disable recording/reproduction of information is not easily caused even in this state.

The thickness of the protective film is preferably 5 to 40 nm. If the thickness is less than 5 nm, the abrasion and damage resistance are significantly decreased. If the thickness exceeds 40 nm, a distance between a magnetic head and the magnetic thin film is increased too much to degrade the characteristics of the magnetic disk. When the layer containing a silicon oxide is to be formed in the vicinity of the interface with respect to the lubricating organic film, the thickness of the layer is preferably at least 3 nm. If the thickness is less than 3 nm, the adhesion strength with respect to the lubricating organic film is not increased. The silicon oxide in the protective film is so formed as not to degrade the magnetic characteristics of the magnetic thin film by oxidation.

In the present invention, a nonmagnetic metal thin film can be formed between the magnetic thin film and the protective film. Although the type of the nonmagnetic metal thin film is not particularly limited, a film consisting of Cr, Ti, Zr, Nb, Ta, W, and Mo or an alloy film consisting of two or more types thereof is preferably used as a barrier film for preventing oxygen in the protective film from being diffused into the magnetic thin film. In particular, a Ti or Cr metal film is preferably used because the film takes oxygen into the film to form a passive film and this passive film prevents diffusion of oxygen into the magnetic thin film. The thickness of the nonmagnetic metal thin film is preferably 1 to 10 nm. If the thickness is less than 1 nm, the film cannot satisfactorily function as a barrier film against diffusion of oxygen. If the thickness exceeds 10 nm, a distance between the magnetic head and the magnetic thin film is increased too much to degrade the recording/reproducing characteristics. The thickness is most preferably 1 to 5 nm to essentially prevent oxidation of the magnetic thin film and degradation in characteristics of the magnetic disk.

As the lubricating organic film used in the present invention, a film of perfluoropolyether is preferably used. Perfluoropolyether having an atom group such as —OH, —COOH, —NCO or an aromatic ring at the terminal end of an organic molecular chain is more preferable because it is strongly bonded to a silicon oxide on the surface of the protective film. Perfluoroalkylpolyether having an aromatic ring at its terminal end and not having a polar group or a reaction group in its molecular is most preferable because it is strongly adhesive to a silicon oxide on the surface of the protective film and has a small friction coefficient which realizes good running characteristics of a magnetic head.

The second aspect of the present invention is a method of manufacturing a magnetic recording medium in which a magnetic thin film is formed on a substrate, an abrasion-resistant protective film is formed on the magnetic thin film, and a lubricating organic film is formed on the protective film, comprising the first step of forming the protective film consisting of carbon and silicon by performing sputtering using a target consisting of carbon and silicon as a cathode in a vacuum tank in which a reduced-pressure atmosphere can be formed, and the second step of heating and oxidizing a part or all of silicon present on at least a surface of the film formed in the first step in an atmosphere containing oxygen before formation of the organic film.

In the sputtering method performed in the reduced-pressure atmosphere in the first step of forming the protective film of the present invention, a method in which a target which consists of a sintered body obtained by mixing a fine carbon powder and a fine silicon powder and has electrical conductivity not causing charge-up of an electrical charge is sputtered by using a DC power source is preferably used. In the event that a sputtering device to be applied for a film formation is such a device having a degree of vacuum of $3 \times 10^{-7}$ Torr or less during the sputtering operation, a slight amount of oxygen gas or the like is added to argon gas and thus a film in which silicon in the film is slightly oxidized can be attained. In turn, also in the event that a degree of vacuum in the sputtering device is not full, a film similar to that attained under an addition of oxygen can be substantially attained. In case of the aforesaid two applications, it is possible to make a substantial reduction of the second stage of oxidization. An inert gas such as argon is used as the reduced-pressure atmosphere, and an oxidizing gas such as oxygen may be added in an amount not producing an oxide on the target surface to render sputtering unstable. The film coated in the first step may be a film consisting of carbon and silicon and not essentially containing oxygen or may contain a silicon oxide. In the above sputtering, although the substrate need not be heated, it may be heated within a temperature range not causing oxidation of the magnetic thin film to degrade the magnetic characteristics. A heating operation may be applied. In view of a anti-wearing characteristic of the film, as a temperature of the substrate during a film formation is higher, its amount of wearing is reduced, so that a temperature of the substrate less than about 300° C. is more preferable. A cause why the anti-wear characteristic is improved is assumed to be based on the fact that the film is more condensed and a close fitting force of the film is more improved.

Oxidation of the protective film in the second step of the present invention can be performed by heating the film in the air or an atmosphere containing oxygen at a reduced pressure. By arbitrarily selecting an oxygen concentration in the atmosphere, a heating temperature, and a heating time, silicon concentration in the film containing carbon and silicon can be partially or essentially entirely oxidized into a silicon oxide in at least a portion near the surface of the film or throughout a thickness direction of the film. A temperature range of (200 to 400° C. is preferable and further a temperature more than 250° C. in which an oxidization process time is short is more preferable and further it does not influence over the substrate or the like and a temperature of less than 300° C. is preferable in view of a cost of the oxidization processing facility. that is, a temperature of 250 to 300° C. more preferable. An example of the magnetic thin film usable in the present invention is a metal magnetic thin film such as a cobalt-nickel-chromium alloy thin film.

As the method of forming the lubricating organic film on the protective film usable in the present invention, a method in which a lubricating agent such as well-known perfluoroalkylpolyether (e.g., Fomblin AM 2001 (tradename)) is dissolved at a proper concentration in an organic solvent and the resultant solution is coated and may be heated as needed can be used. In particular, perfluoroalkylpolyether having a reactive group or an aromatic group at the terminal end of a molecular chain is preferably because it has good adhesion properties with respect to the protective film.

The third aspect of the present invention is a method of manufacturing a magnetic recording medium in which a magnetic thin film is formed on a substrate, an abrasion-resistant protective film is formed on the magnetic thin film, and a lubricating organic film is formed on the protective film, comprising the first step of forming the protective film consisting of carbon and silicon by performing sputtering using a target consisting of carbon and silicon as a cathode in a vacuum tank in which a reduced-pressure atmosphere can be formed, and the second step of oxidizing, using an oxygen ion plasma, a part or all of silicon present on at least a surface of the film formed in the first step before formation of the organic film.

In the sputtering method performed in the reduced-pressure atmosphere in the first step of forming the protective film of the present invention, a method in which a target which consists of a sintered body obtained by mixing a fine carbon powder and a fine silicon powder and has electrical conductivity not causing charge-up of an electrical charge is sputtered by using a DC power source is preferably used. An inert gas such as argon is used as the reduced-pressure atmosphere, and an oxidizing gas such as oxygen may be added in an amount not producing an oxide on the target surface to render sputtering unstable. The film coated in the first step may be a film consisting of carbon and silicon and not essentially containing oxygen or may contain a silicon oxide. In the above sputtering, although the substrate need not be heated, it may be heated within a temperature range not causing oxidation of the magnetic thin film to degrade the magnetic characteristics. In view of an anti-wear characteristic of the film, as a temperature of the substrate during film formation is high, its amount of wear is less, resulting in that it is preferable to perform a heating of less than about 300° C. A cause of improving an anti-wearing under a heating of the substrate is assumed to be a fine structure of the film and an improved close fitness of the film.

Oxidation of the protective film performed in the second step of the present invention is performed by exposing the surface of the film coated in the first step and mainly consisting of carbon and silicon to an oxygen plasma. This oxygen plasma can be generated by a well-known plasma generating apparatus for applying an RF voltage. In addition, as a method for performing an oxidization, there is a method for oxidizing from a film surface under pressure of ozone. This oxidization process with this ozone has no need of heating operation and its device is simplified. In addition, this process is superior due to the fact that its processing time can be shortened.

Examples of the substrate used in the present invention are a glass substrate, a ceramic substrate, and an aluminum substrate.

The protective film according to the present invention contains carbon and silicon, and silicon is partially or entirely oxidized into a silicon oxide in at least the interface of the film which is in contact with the lubricating organic film. The protective film has solid lubricating properties. The lubricating organic film coated on the protective film comes in contact with the carbon component of the protective film and is strongly bonded to the silicon oxide component of the protective film. That is, the silicon oxide component in the protective film of the present invention improves the adhesion properties with the lubricating organic film, and the carbon component in the protective film imparts the solid lubricating properties to the protective film. Therefore, even if the lubricating organic film coated on the protective film is locally peeled, the carbon component is exposed to the surface to maintain the solid lubricating properties. At this time, since a friction coefficient with respect to a magnetic head is not increased, a damage to the magnetic thin film caused by head crash can be prevented.

It is important that a carbon film containing Si can be formed into a film under a CD sputtering showing a high mass production. A formation with another film forming method utilizing high-frequency wave is substantially meaningless. That is, its device cost is high and a poor stability in case of production is found. In addition, a carbon film containing Si may also be manufactured by a CVD method using a high frequency wave. The film made by this method contains a substantial amount of hydrogen without fail, so that this film results in such a film as one having a different feature from a film made under a sputtering method. That is, in order to improve a saturating characteristic with fluorine oil, it is necessary to cause a non-coupled element in the film surface at least and in case of carbon containing Si, it is necessary that Si—O— should be present. However, in case of the film made under a CVD method, a hydrogen h is coupled with Si to make Si—H. Accordingly, the non-coupling element is eliminated, so that an affinity with the oil is deteriorated and an addition of Si in carbon is meaningless.

The above, and other, objects, features and advantages of the present invention, will become readily apparent from the following detailed description thereof which is to be read in connection with the accompanying drawings in which the same or corresponding parts are identified by the same reference numerals in the several views.

DETAILED DESCRIPTION OF THE PREFERRED EMBODIMENT

Figure 1:
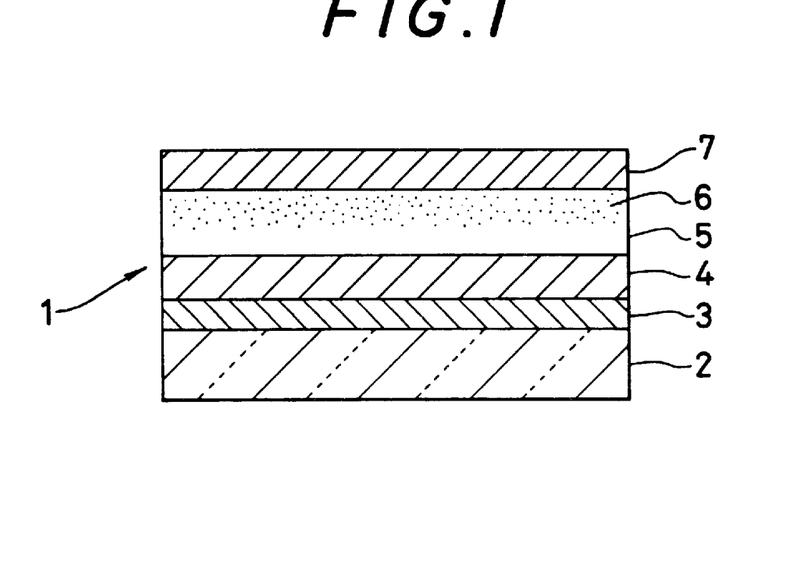
FIG. 1 is a sectional view showing a part of the first embodiment of a magnetic recording medium according to the present invention.
Figure 2:
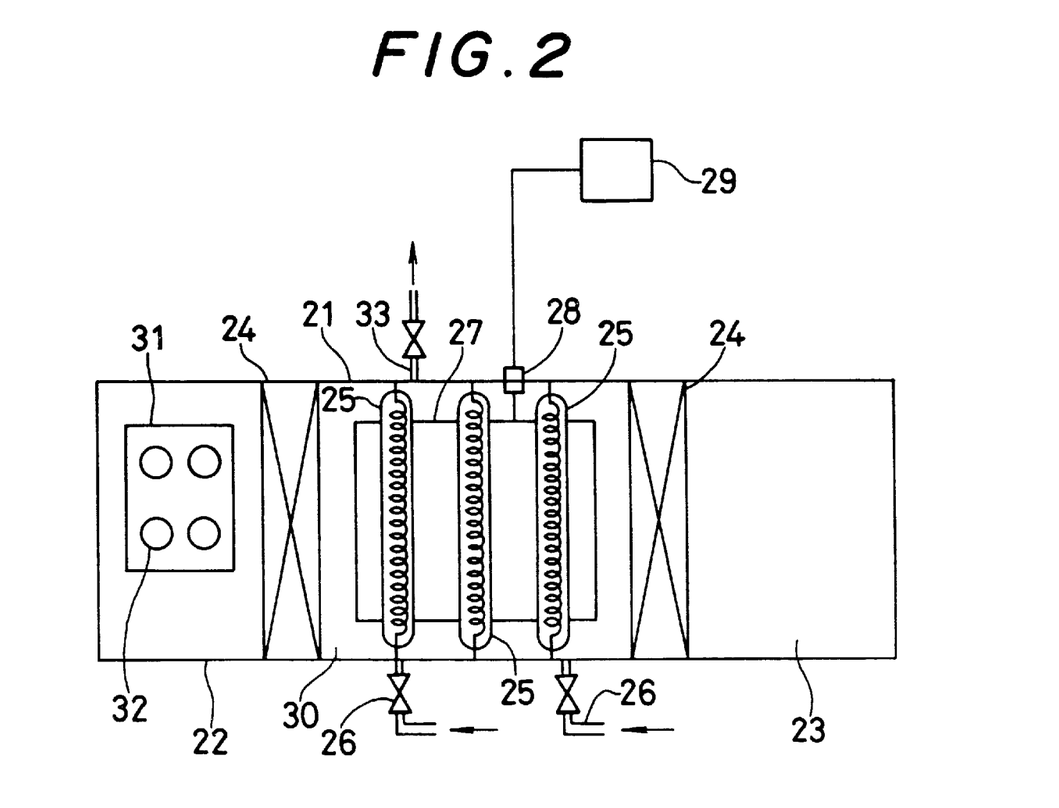
FIG. 2 is a schematic view showing an oxidizing apparatus used to form a silicon oxide in a protective film of the present invention.
Figure 3:
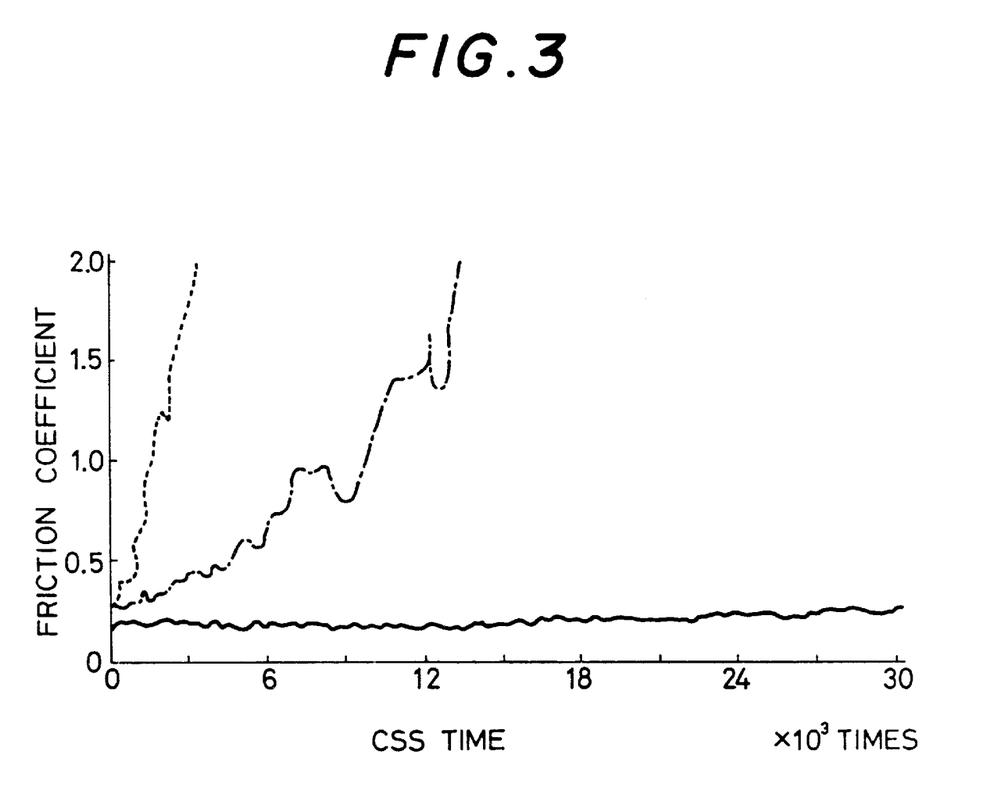
FIG. 3 is a graph showing CSS characteristics of the magnetic recording medium of the present invention.

An embodiment of the present invention will be described below. FIG. 1 is a sectional view showing a part of an embodiment of a magnetic recording medium 1 according to the present invention. Referring to FIG. 1, and undercoating chromium film 3 is coated on a glass substrate 2 having an uneven surface of about 3 mm (Ra) surface roughness, and a magnetic thin film 4 is coated on the undercoating chromium film 3 and protected by a solid lubricating protective film 5 containing carbon and silicon. In addition, a lubricating organic film 7 is coated on the protective film 5 to decrease a friction coefficient on the surface of the magnetic recording medium 1. Further, the protective film 5 contains silicon oxide 6 in an interface in contact with the organic film 7. FIG. 2 shows an oxidizing apparatus used to form a silicon oxide in the protective film of the present invention. Referring to FIG. 2, a vacuum tank 21 in which a reduced-pressure atmosphere can be formed is separated into three chambers, i.e., a load chamber 22, a treatment chamber 30 and an unload chamber 23, respectively connected to exhaust devices (not shown), by gate valves 24 which can be opened/closed. Samples 32 set in a holder 31 are loaded in the load chamber 22 and maintained at an arbitrary pressure. Thereafter, the samples 32 are conveyed to the treatment chamber 30 by a conveyor (not shown) and oxidized. The oxidized samples 32 are conveyed to the unload chamber 23 and removed from the vacuum tank 21. The treatment chamber 30 includes a gas supply pipe 26 for externally supplying a gas at a controlled flow rate, a gas exhaust pipe 33, heaters 25 for heating the samples 32, and parallel plate electrodes 27 for generating an RF plasma. The parallel plate electrodes 27 are electrically insulated from the vacuum tank 21 by an electrically insulating member 28 and connected to an external power source 29. FIG. 3 is a graph showing CSS characteristics of the magnetic recording medium of the present invention.

EXAMPLE 1

A 1.1-mm thick chemically reinforced float glass disk consisting of soda lime was cleaned, and an undercoating chromium film and a magnetic thin film consisting of a cobalt-nickel-chromium alloy were sequentially formed on the disk by an in-line sputtering apparatus. That is, as the undercoating film, a chromium target was subjected to DC sputtering in an argon atmosphere at a pressure of 0.4 Pa (pascal) to form a chromium film having a thickness of 150 nm. Thereafter, a magnetic thin film having a thickness of 50 nm was coated by DC sputtering performed in an argon atmosphere at 0.4 Pa using a cobalt-nickel-chromium alloy as a target. Subsequently, a sintered body consisting of 90 atomic % of carbon and 10 atomic % of silicon was used as a target to perform DC sputtering in an argon atmosphere at 0.4 Pa, thereby coating a 20-nm thick protective film containing carbon and silicon. The glass sample obtained by coating the films including the protective film was removed from the sputtering apparatus, set in the load chamber of the oxidizing apparatus shown in FIG. 2 in which all of the chambers were set at the atmospheric pressure, and conveyed to the treatment chamber. In the treatment chamber, oxidation of the protective film was performed by heating at 300° C. for 10 minutes by an infrared heater while supplying a mixed gas consisting of 30% of oxygen and 70% of argon at a flow rate of 500 ml/min. As a result, it was confirmed by ESCA (Electron Spectrometry for Chemical Analysis) that a silicon oxide was formed from the surface to a depth of about 10 nm of the protective film. The sample removed from the oxidizing apparatus was dipped in a dipping solution prepared by diluting perfluoroalkylpolyether (Fomblin AM 2001 (tradename)) in a fluorine-based solvent (DAIFLON S3 (tradename)) available from DAIKIN INDUSTRIES LTD.) at a concentration of 0.05%, thereby coating a lubricating organic film. Thereafter, the resultant sample was heated at 110° C. for five minutes to obtain a sample 1 of the magnetic recording medium. The abrasion characteristic of the sample 1 was checked by a CSS test in which contact/separation of a magnetic head was repeatedly performed at a high rotation speed of 3,600 rpm. As a result, as indicated by a solid curve in FIG. 3, no change was found on the disk surface and almost no increase was found in kinetic coefficient of friction even after the CSS was repeated 30,000 times.

EXAMPLE 2

Following the same procedures as in Example 1, a magnetic thin film and a protective film were coated on a 1.1-mm thick chemically reinforced float glass disk plate, and the resultant glass plate was set in the load lock chamber 22 of the apparatus shown in FIG. 2. After the glass plate was conveyed to the treatment chamber, an oxygen partial pressure of 20 Pa (Pascal) was set in the treatment chamber, and an RF voltage of 13.56 MHz was applied to the parallel plate electrodes 27 to generate an oxygen plasma for 10 minutes, thereby performing oxidation of the film containing carbon and silicon. As a result, it was confirmed by the ESCA performed in a thickness direction of the film that a silicon oxide was formed from the surface to a depth of about 5 nm of the protective film. Following the same procedures as in Example 1, a lubricating organic film was coated on the surface of the protective film, and the resultant structure was heated at 110° C. for five minutes. The CSS test was performed for a sample 2 of the magnetic recording medium obtained as described above. As a result, as indicated by a solid curve in FIG. 3, no abnormality was found on the disk surface and almost no increase was found in kinetic coefficient of friction even after the test was repeated 30,000 times, as in Example 1.

COMPARATIVE EXAMPLE 1

A 1.1-mm thick chemically reinforced flat glass disk consisting of soda lime was cleaned, and an undercoating chromium film and a magnetic thin film consisting of a cobalt-nickel-chromium alloy were sequentially coated by the same in-line sputtering apparatus as in Example 1. A 150-nm thick chromium film was coated by performing a DC sputtering for a chromium target in an argon atmosphere at a pressure of 0.4 Pa (pascal). Thereafter, a cobalt-nickel-chromium alloy was used as a target to perform DC sputtering in an argon atmosphere at 0.4 Pa, thereby coating a magnetic thin film having a thickness of 50 nm. Subsequently, a 20-nm thick carbon protective film was coated on the magnetic thin film by performing DC sputtering in an argon atmosphere at 0.4 Pa using carbon as a target. This sample was removed from the sputtering apparatus and dipped in a dipping solution prepared by diluting perfluoroalkylpolyether (Fomblin AM 2001 (tradename)) in a fluorine-based solvent (DAIFLON S3 (tradename) available from DAIKIN INDUSTRIES LTD.) at a concentration of 0.05% to coat a lubricating organic film on the protective film, thereby obtaining a comparative sample 1 of the magnetic recording medium. Following the same procedures as in Example 1, the abrasion characteristic of the comparative sample 1 was checked by the CSS test in which contact/separation of a magnetic head was repeatedly performed at a high rotation speed of 3,600 rpm. As a result, as indicated by a broken curve in FIG. 3, abrasion marks were formed on the disk surface and the value of a kinetic coefficient of friction was significantly increased to be about 2.0 after the CSS was repeated only 3,500 times.

COMPARATIVE EXAMPLE 2

Following the same procedures as in Example 1, an undercoating film and a magnetic thin film were coated on a 1.1-mm thick chemically reinforced float glass disk consisting of soda lime. The resultant structure was dipped in a dipping solution prepared by diluting perfluoroalkylpolyether (Fomblin AM 2001 (tradename)) in a fluorine-based solvent (DAIFLON S3 (tradename) available from DAIKIN INDUSTRIES LTD.) at a concentration of 0.05% to coat a lubricating organic film on the magnetic thin film, thereby obtaining a comparative sample 2 of the magnetic recording medium. Following the same procedures as in Example 1, the abrasion characteristic of the comparative sample 2 was checked by the CSS test in which contact/separation of a magnetic head was repeatedly performed at a high rotation speed of 3,600 rpm. As a result, as indicated by a long-short dashed curve in FIG. 3, abrasion marks were found on the disk surface and the value of a kinetic coefficient of friction was significantly increased to be about 2.0 after the CSS was repeated 13,500 times.

As has been described above, in the magnetic recording medium of each of Examples 1 and 2 according to the present invention, as compared with those of Comparative Examples 1 and 2, the CSS characteristic was largely improved, and the kinetic coefficient of friction on the disk surface was able to be maintained at a small value even after the disk was used as a large number of times.

EXAMPLE 3

A protection film containing a carbon of 80 atomic % and a silicon of 20 atomic % is formed on a magnetic film in the same manner as that of the example 1 under a DC current sputtering method in Tg 40 nm. After performing an oxidation process similar to that of the preferred embodiment 1, the sample 3-1 is applied with the same oil as that of the example 1. The sample 3-2 is applied with oil of parfloropolyether having —COOH group at its terminal end, thereafter it is heated at about 100° C. for ten minutes and then a magnetic recording medium is made. These samples were tested for CSS test in the same manner as that of the example 1, resulting in that the sample 3-1 has a static coefficient of friction of 0.6 after 30000 times of tests and the sample 3-2 showed a static coefficient of friction of 0.5 after 3000 times of test. Both of them showed a superior result.

EXAMPLE 4

Twenty samples of which films were formed under a DC sputtering process with a protection film having a different amount of Si as described below on a magnetic film in the same manner as that of the preferred embodiment with Tg of 42 nm were made. Fifteen samples each of which contains Si were made by a method wherein an oxidization process similar to that of the example 1 was applied and an oil applying process is applied so as to make a magnetic disk. Each of the remaining five samples was oxidized in the same manner as that of the example 1 and then magnetic disks having no oil therein were made. Composition of silicon and carbon of the samples having different amounts of Si are indicted in table 1.

Each of ten samples of each of the magnetic disks having oil in these samples coated thereon was tested with a CSS test similar to that of the example 1. A test result became as indicated in table 1. Checking this result shows that a mere addition of Si of more than 1% improves more a performance of CSS. In addition, even in the even that a sample having an amount of Si more than 30%, a coefficient of friction of the sample after CSS is lower than that of the sample having a less amount of Si and further its rate of acceptance is high. This is assumed to be based on the fact that as an amount of Si is increased under application of oil, the wearing is hardly carried out as long as the oil sufficiently covers the surface. The samples not accepted due to an amount of Si more than 30% were all crushed at heads.

Figure 4:
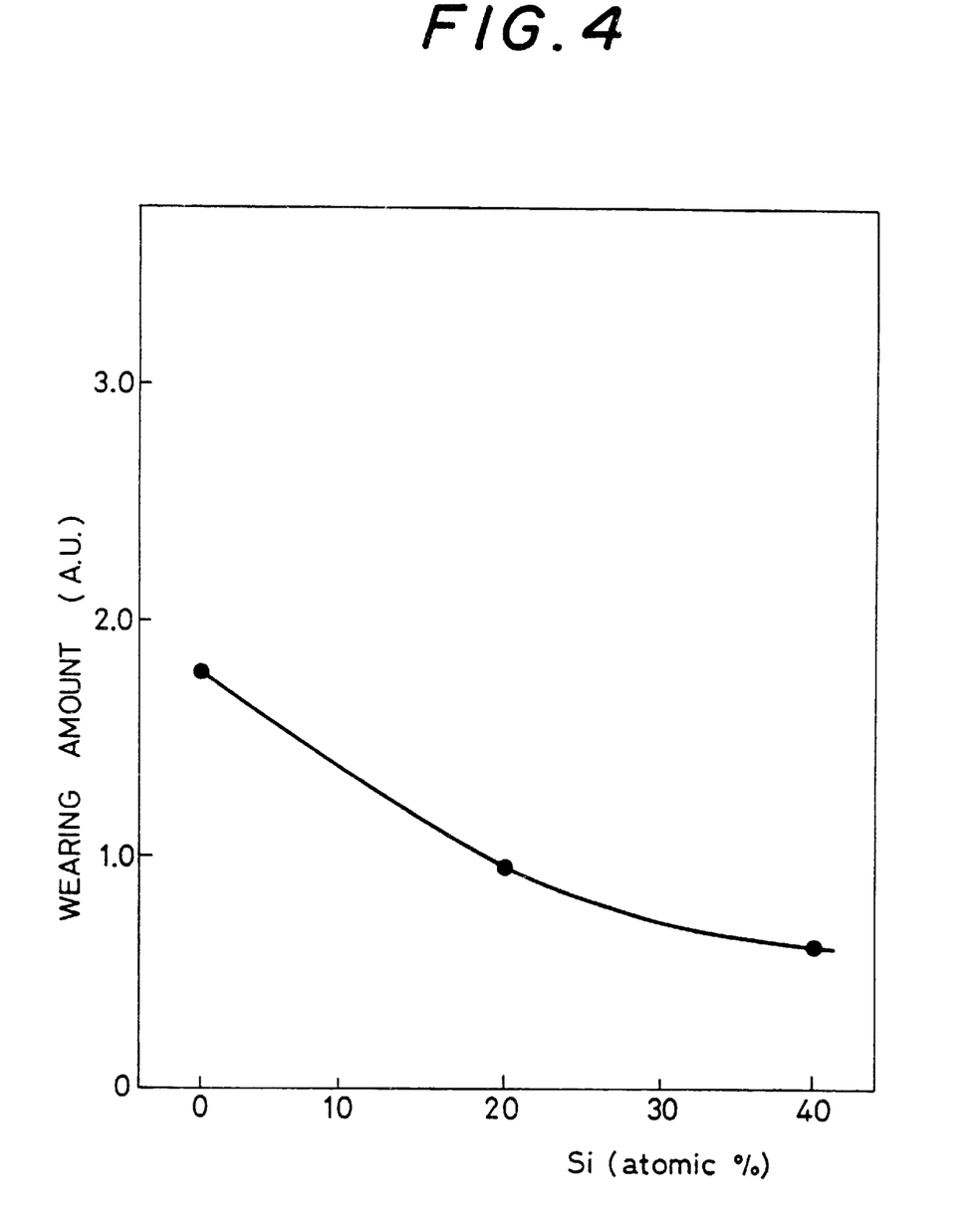
FIG. 4 is a graph showing a wearing amount of a Si-doped C film in the example 4 of the present invention.
Figure 5:
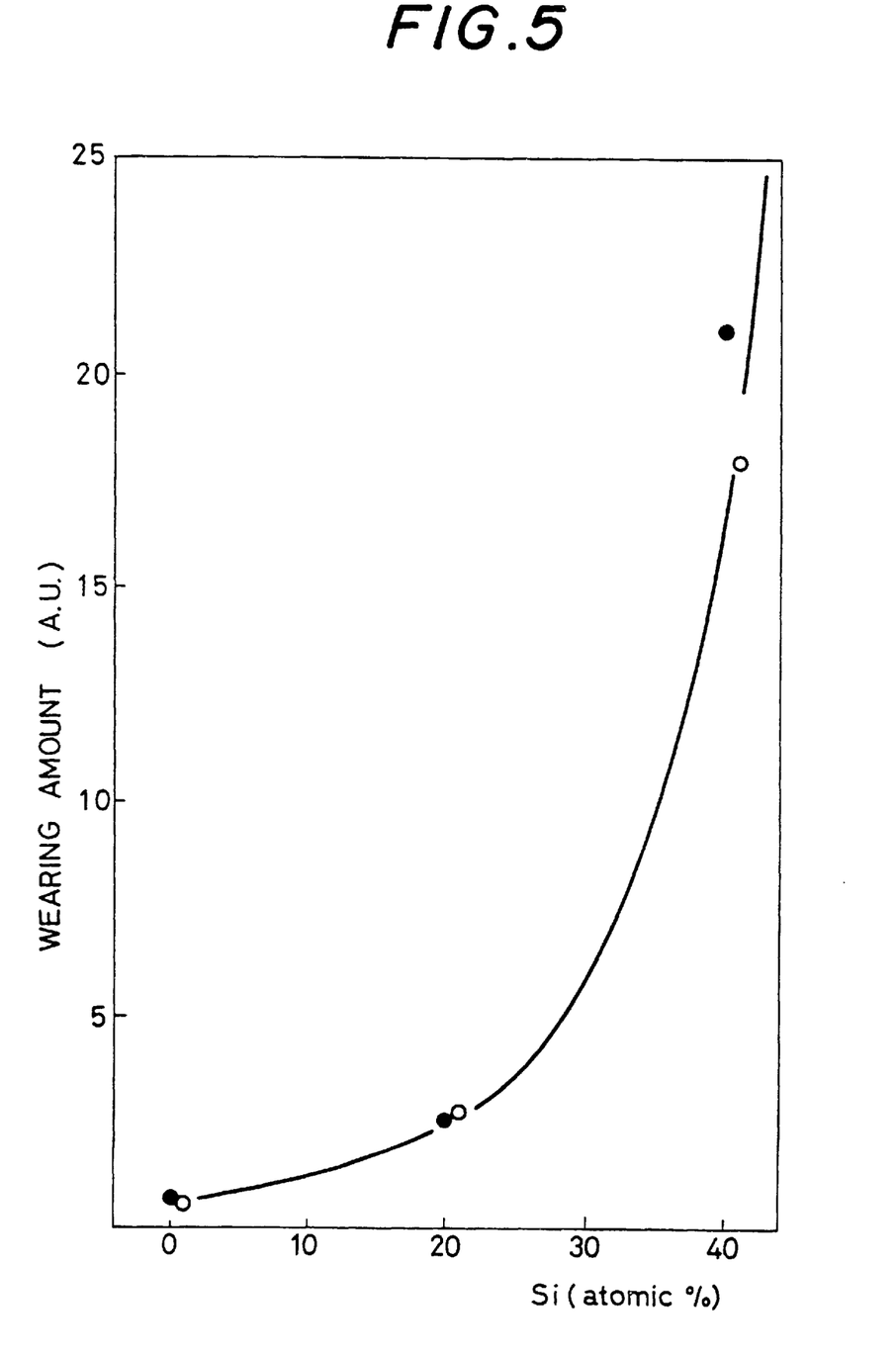
FIG. 5 is a graph showing a wearing amount of a Si-doped C film in the example 5 of the present invention.

In turn, in FIGS. 4 and 5 are shown results in which each of five samples coated with oil and each of five samples not coated with oil were pin disk wearing tested of $Al_2O_3$.TiC (Altec) having the same material quality as that of the head number of a diameter of 2.3 mm (a wearing condition: a load of 5 g, a line speed 63 cm/sec, an applied time of 60 minutes: a measurement of wearing amount: a Taristep of Tallers Hobson) (Data in the figures show a mean value of each of the samples). in the event that oil is applied to the surface, an amount of wearing is decreased as an amount of Si is increased and this shows that this is well coincided with a result of the aforesaid CSS test. However, in the even that the oil is not applied to the surface, the amount of wearing is increased as an amount of Si is increased to the contrary to the case in which the oil is applied and a wearing is rapidly increased at a region where Si exceeds 30%. In the region where a large amount of Si is present, the film is severely worn out, resulting in that a measurement data of the amount of wearing shows a substantial dispersion.

TABLE 1

CSS Test Result of Carbon FIlm Containing Si

| Sample No. | Amount of Si (atomic %) | CSS Performance ① (A coefficient of friction u after ×10³ times) | | | Rate of Acceptance ② | Wearing Form ③ |
|---|---|---|---|---|---|---|
| | | 2 | 20 | 30 | | |
| 4-1 | 0 | 0.20 | 0.80 | 1.60 | 0.1 | M |
| 4-2 | 1 | 0.20 | 0.65 | 1.10 | 0.5 | M |
| 4-3 | 5 | 0.25 | 0.60 | 0.85 | 0.8 | M |
| 4-4 | 10 | 0.25 | 0.30 | 0.35 | 1.0 | M |
| 4-5 | 15 | 0.25 | 0.30 | 0.35 | 0.9 | M |
| 4-6 | 20 | 0.25 | 0.30 | 0.35 | 1.0 | M |

TABLE 1-continued

CSS Test Result of Carbon Film Containing Si

| Sample No. | Amount of Si (atomic %) | CSS Performance ① (A coefficient of friction u after ×10³ times) | | | Rate of Acceptance ② | Wearing Form ③ |
|---|---|---|---|---|---|---|
| | | 2 | 20 | 30 | | |
| 4-7 | 25 | 0.25 | 0.30 | 0.35 | 0.9 | M |
| 4-8 | 30 | 0.25 | 0.30 | 0.30 | 1.0 | M |
| 4-9 | 35 | 0.25 | 0.30 | 0.30 | 0.7 | S |
| 4-10 | 40 | 0.25 | 0.30 | 0.30 | 0.6 | S |

① CSS performance is a mean value of coefficients of friction of samples not crushed at heads after each of times.
② A rate of acceptance is the number in ten samples not crushed at heads after 30000 times (rate).
③ A wearing form of M indicates a mild wearing and S indicates a severe wearing, respectively.

EXAMPLE 5

Each of four protection films were made under a Dc sputtering by the same method as that of the example 1 in which the protection films containing an amount of Si of 20 atomic % on the magnetic film as follows, a film formation gas pressure was changed at a film thickness of 25 nm, respectively. Each of the two films in the four films was oxidized at 250° C. for three hours in the same manner as that of the example 1 and the remaining films were not heat treated, but the following evaluation was carried out.

Figure 6:
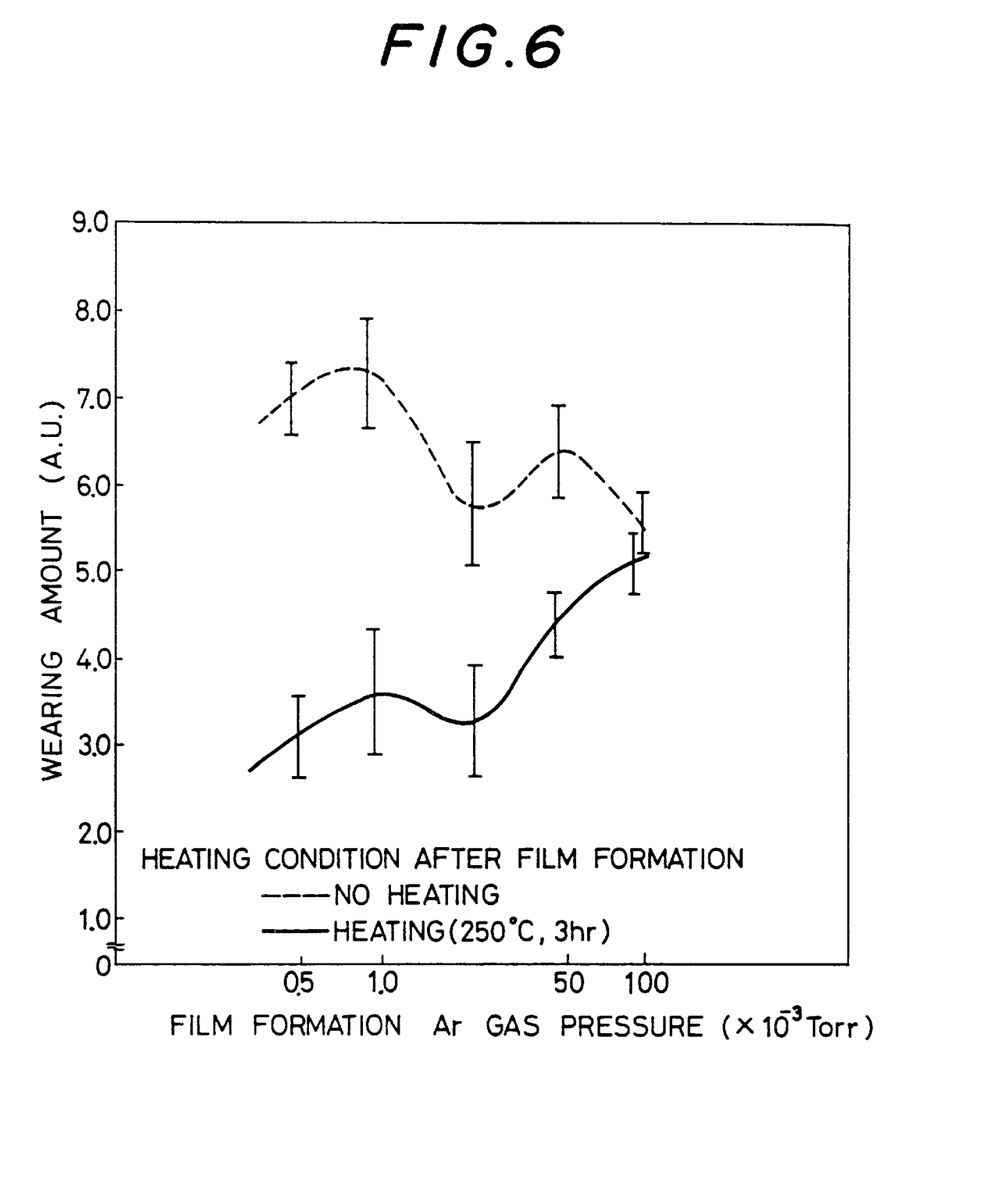
FIG. 6 is a graph showing the relation between a wearing amount and a gas pressure (presence of oxidation) in the example 5 of the present invention.

Then, these samples were evaluated under the same pin disk wearing test similar to that of the example 4. The result is indicated in FIG. 6. Although the oxidized sample showed a decreased amount of wearing as a film formation gas pressure was decreased. However, the samples not oxidized showed a minimum value near $2.5 \times 10^{-2}$ Torr. This means that a film stress is minimum under this film formation gas pressure.

EXAMPLE 6

Protection films with an amount of Si of 10 atomic % and 20 atomic % were formed on a magnetic film, respectively in the same manner as that of the example 1 with a film thickness of 25 nm under a DC sputtering. These samples were made by varing an oxidization temperature of 100 to 450° C. in the same manner as that of the example 1. A magnetic characteristics of each of these samples was evaluated and a degree of deterioration of a magnetic characteristics was checked.

As a result, a sufficient oxidization was not attained under a temperature of less than 200° C. even for ten hours processing. A processing time required for an oxidation was six hours at 200° C., one hour at 300° C. and less than one hour at more than 300° C. As a practical matter, it was found that a temperature higher than 250° C. was superior. In turn, as a result of evaluation of a magnetic characteristic of the samples processed for a processing time required for carrying out oxidation, it showed that a coerceive force and a remained magnetized amount under a temperature less than 300° C. were a varying amount of less than 2%. At a temperature of 300 to 400° C., the coerceive force was increased by a maximum amount of 10% and a remained magnetized amount was decreased by a maximum amount of 7% or so. However, the coerceive force was deceased at a temperature more than 400° C., the remained magnetized amount was substantially decreased and this level could not be applied.

EXAMPLE 7

A protective film containing Si by 20 atomic % was formed on a magnetized film in the same manner as that of the example 1 by a method wherein a temperature of the substrate was varied during the film formation and the film was processed under a DC sputtering with a film thickness of 25 nm. These samples were oxidized for one hour at a temperature of 300° C. in the same manner as that of the example 1.

Figure 7:
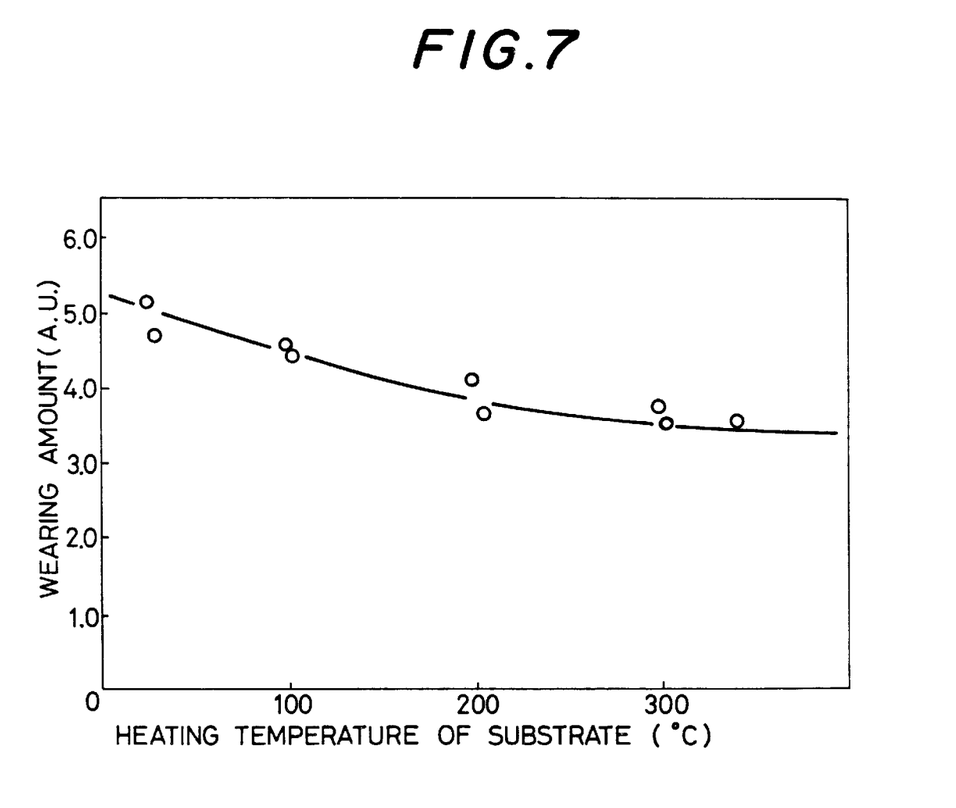
FIG. 7 is a graph showing the relation between a wearing amount and a substrate temperature in the example 7 of the present invention.

These samples were evaluated for their wearing amounts under the pin disk wearing test in the same manner as that of the example 4. Its results are indicated in FIG. 7. As a temperature of the substrate is increased, its wearing amount is decreased. It was approximately saturated at a temperature of higher than 300° C.

EXAMPLE 8

A protection film containing Si by 20 atomic % was made on a magnetic film in the same manner as that of the example 1 by a method wherein the film thickness was varied and it was processed under a DC sputtering. These samples were oxidized for one hour at a temperature of 300° C. in the same manner as that of the example 1 and then oil was applied on the surface.

Durability of these samples was checked with CSS test which was similar to that of the example 1, resulting in that there was no difference at all at a thickness of the protection film of 15 nm or more. A coefficient of friction even at CSS of 30000 times was 1.0 or less. Although at the film thickness of about 10 to 15 nm, a coefficient of friction along with CSS was increased, there was no chance that a coefficient of friction at 2000 times was not exceeded over 1.0. in addition, in the even that a film thickness was thinned, a friction could easily be generated and a coefficient of friction at CSS at several times exceeded 1.0.

In view of this fact, in regard to a size less than 10 nm, fluorine oil was having —COOH group similar to that of the example 3 at its terminal end was applied as an oil to a disk similar to the foregoing disk, a heat treatment was carried out for ten minutes at about 100° C. to form an inner film thickness of a magnetic disk of 5 mm or more. The disk was not worn out, resulting in that a coefficient of friction at CSS of 10000 times was less than 1.0.

EXAMPLE 9

A protection film containing an amount of Si of 20 atomic % was formed on a magnetic film in the same manner as that of the example by a method wherein a small amount of oxygen gas was mixed in Ar gas, a purity of sputtering gas was varied and the film was made under a DC sputtering. These samples were applied for checking a degree of oxidization through Fourier Transfer Infrared Spectrophotomer (FTIR) in reference to an amount of absorption caused by an Si—O coupling, resulting in that a degree of oxidization was approximately proportional to an amount of oxygen gas and a degree of vacuum only when oxygen gas was flowed was $4 \times 10^{-6}$ Torr and this value was the same oxidization level as that of the oxidized sample with no addition of oxygen.

Then, these samples were evaluated for their wearing characteristics with a pin disk wearing test in the same manner as that of the example 4. As a result, at a value of more than $8 \times 10^{-7}$ Torr, a wearing amount was increased in proportionate to an amount of oxygen gas and no change was found at a value less than $8 \times 10^{-7}$ Torr. In view of the result of wearing, it is preferable that the film is formed at an amount of contamination gas.

EXAMPLE 10

A protection film containing Si by 20 atomic % was formed on a magnetic film in the same manner as that of the example 1 by a method wherein two samples were made under a DC sputtering with a film thickness of 25 nm. One sample was placed in an ozone generator, ozone was radiated onto the sample for about ten minutes and another sample was oxidized in the same manner as that of the example 1. The two samples were checked for their degree of oxidization by FTIR device which is similar to that of the example 9, resulting in that their degrees of oxidization were approximately the same to each other. Then, oil was applied to these samples in the same manner as that of the example 1 to make a magnetic disk. A CSS test was carried out for these samples, resulting in that coefficients of friction of these samples were less than 1.0 even after CSS of 3000 times and there as no specific difference between them.

Since the magnetic recording medium of the present invention has as its uppermost layer a lubricating organic film strongly adhered to a protective film, the surface of the magnetic recording medium is not deteriorated even by frequent contact with a magnetic head upon driving or stopping of the medium. In addition, in the magnetic recording medium of the present invention, even when the organic film is locally peeled, the protective film having lubricating properties is exposed to the surface of the medium. Therefore, no large frictional force is produced between a magnetic head and the surface of the magnetic recording medium to cause the magnetic head to destroy a magnetic thin film.

Furthermore, the method of oxidizing silicon in the protective film into a silicon oxide according to the present invention can coat a film containing silicon and carbon at a high speed and can oxidize the coated film containing silicon and carbon within a short time period. Therefore, a magnetic recording medium can be manufactured at a low cost.

Having described a specific preferred embodiment of the present invention with reference to the accompanying drawings, it is to be understood that the invention is not limited to the that precise embodiment, and that various changes and modifications may be effected therein by one skilled in the art without departing from the scope or spirit of the invention as defined in the appended claims.

What is claimed is:

1. A method of manufacturing a magnetic recording medium in which a magnetic thin film is formed on a substrate directly or via an undercoating film, an abrasion-resistant protective film is formed on said magnetic thin film, and a lubricating organic film is formed on said protective film comprising:

the first step of depositing said protective film consisting essentially of carbon and silicon by sputtering a target composed of a mixture of carbon and silicon as a cathode in a vacuum tank in which a reduced-pressure atmosphere can be formed, said silicon in said protective film ranges from 5 to 25% atomic percent with respect to said carbon in said protective film; and the second step of heating and oxidizing a part or all of said silicon present on at least a surface of said protective film formed in said first step in an atmosphere containing oxygen before formation of said organic film, said silicon at least in an interface in contact with said organic film being oxidized at least partially to silicon oxide, and said lubricating organic film being bonded to said silicon oxide in said interface thereby said silicon oxide substantially improving adhesion of said lubricating organic film to said protective film.

2. A method according to claim 1, wherein a heating temperature in said second step is 200° C. to 400° C.

3. A method according to claim 1, wherein a nonmagnetic metal film containing at least one member selected from the group consisting of Cr, Ti, Zr, Nb, Ta, W and Mo is formed between said protective film and said magnetic thin film.

4. A method of manufacturing a magnetic recording medium in which a magnetic thin film is formed on a substrate directly or via an undercoating film, an abrasion-resistant protective film is formed on said magnetic thin film, and a lubricating organic film is formed on said protective film, comprising:

the first step of depositing said protective film consisting essentially of carbon and silicon by sputtering a target compound of a mixture of carbon and silicon as a cathode in a vacuum tank in which a reduced-pressure atmosphere can be formed, said silicon in said protective film ranges from 5 to 25 atomic percent with respect to said carbon in said protective film; and the second step of oxidizing, using an oxygen ion plasma, a part or all of said silicon present on at least a surface of said protective film formed in said first step before formation of said organic film, said silicon at least in an interface in contact with said organic film being oxidized at least partially to silicon oxide, and said lubricating organic film being bonded to said silicon oxide in said interface thereby said silicon oxide substantially improving adhesion of said lubricating organic film to said protective film.

5. A method according to claim 4 wherein a nonmagnetic metal film containing at least one member selected from the group consisting of Cr, Ti, Zr, Nb, Ta, W and Mo is formed between said protective film and said magnetic thin film.

* * * * *